United States Patent
Sang et al.

(10) Patent No.: US 9,925,729 B2
(45) Date of Patent: Mar. 27, 2018

(54) METHOD FOR MAKING COMPOSITE STRUCTURE WITH A SURFACING FILM THEREON

(71) Applicant: CYTEC TECHNOLOGY CORP., Wilmington, DE (US)

(72) Inventors: Junjie Jeffrey Sang, Newark, DE (US); Dalip Kumar Kohli, Churchville, MD (US)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 0 days.

(21) Appl. No.: 15/458,091

(22) Filed: Mar. 14, 2017

(65) Prior Publication Data

US 2017/0182719 A1 Jun. 29, 2017

Related U.S. Application Data

(63) Continuation of application No. 13/706,425, filed on Dec. 6, 2012, now Pat. No. 9,676,961.
(Continued)

(51) Int. Cl.
| | |
|---|---|
| *B29C 70/34* | (2006.01) |
| *C08L 63/04* | (2006.01) |
| *B29C 37/00* | (2006.01) |
| *B32B 27/20* | (2006.01) |
| *B32B 27/38* | (2006.01) |
| *B32B 27/08* | (2006.01) |
| *B29K 63/00* | (2006.01) |
| *B29K 105/08* | (2006.01) |
| *B29L 9/00* | (2006.01) |

(Continued)

(52) U.S. Cl.
CPC .......... *B29C 70/34* (2013.01); *B29C 37/0025* (2013.01); *B32B 27/08* (2013.01); *B32B 27/20* (2013.01); *B32B 27/38* (2013.01); *C08L 63/04* (2013.01); *B29K 2063/00* (2013.01); *B29K 2105/0872* (2013.01); *B29K 2105/16* (2013.01); *B29K 2509/02* (2013.01); *B29L 2009/00* (2013.01); *B32B 2255/10* (2013.01); *C08L 2203/16* (2013.01)

(58) Field of Classification Search
CPC ... C08K 2201/005; B32B 27/08; B32B 27/12; B32B 27/286; B32B 27/38; B32B 2264/102; B32B 2264/107; B32B 2270/00; B32B 2307/202; C09D 163/04; C08G 59/182
USPC .............................. 428/292.1, 325; 442/339
See application file for complete search history.

(56) References Cited

U.S. PATENT DOCUMENTS

| | | | |
|---|---|---|---|
| 5,006,611 A * | 4/1991 | Schmid ................... | C08G 59/32 525/423 |
| 2008/0200599 A1* | 8/2008 | Grasboeck ............ | C04B 41/009 524/436 |

FOREIGN PATENT DOCUMENTS

WO    wo2007127032 A2 * 11/2007

\* cited by examiner

*Primary Examiner* — Vincent A Tatesure
(74) *Attorney, Agent, or Firm* — Thi Dang

(57) ABSTRACT

A method for making a composite structure with a surfacing film thereon. The surfacing film is co-cured with fiber-reinforced resin composite materials. The surfacing film is formed from a curable resin composition containing an epoxy novolac resin, a tri-functional or tetra-functional epoxy resin, ceramic microspheres, an amine-based curing agent, particulate inorganic fillers; and a toughening component. The surfacing film exhibits high $T_g$ and high cross- (Continued)

linked density after curing, as well as high resistance to paint stripper solutions.

9 Claims, 1 Drawing Sheet

Related U.S. Application Data

(60) Provisional application No. 61/569,129, filed on Dec. 9, 2011.

(51) Int. Cl.
*B29K 105/16* (2006.01)
*B29K 509/02* (2006.01)

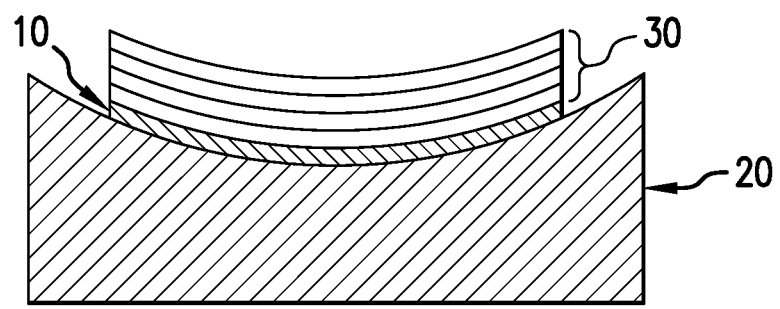

METHOD FOR MAKING COMPOSITE STRUCTURE WITH A SURFACING FILM THEREON

The current application is a divisional application of U.S. application Ser. No. 13/706,425 filed on Dec. 6, 2012, which claims the benefit of prior U.S. Provisional Application No. 61/569,129 filed on Dec. 9, 2011, both of which are incorporated herein in its entirety.

BACKGROUND

The present disclosure relates generally to composite surfacing films. More particularly, the present disclosure relates to surfacing films for fiber-reinforced, polymer matrix composite structures.

Fiber-reinforced, polymer matrix composites (PMCs) are high-performance structural materials that are commonly used in applications requiring resistance to aggressive environments, high strength, and/or low weight. Examples of such applications include aircraft components (e.g., tails, wings, fuselages, and propellers), high performance automobiles, boat hulls, and bicycle frames.

Conventional composite structures used in the aerospace industry typically include a surfacing film to provide the required performance characteristics to the composite structures prior to painting. These surfacing films are used to improve the surface quality of the structural parts while reducing labor, time and cost. The surfacing films are usually co-cured with the polymer matrix composite materials during the manufacturing of the structural parts. However, conventional surfacing films are not very resistant to commercial paint stripping solutions, such as benzyl alcohol-based solutions, for paint-stripping purposes. Those paint strippers can cause swelling and/or blistering of the surfacing film and may make the re-painting process more cumbersome. As such, there exists a need for a surfacing film that can withstand repeated paint stripping using conventional paint stripping solutions to allow re-painting of composite structures and durable paint adhesion over the service life, and can also withstand exposure to ultra-violet (UV) radiation.

SUMMARY

The present disclosure provides a surfacing film formed from a curable composition that includes: an epoxy novolac resin having epoxy functionality of more than one; a tri-functional or tetra-functional epoxy resin; ceramic microspheres; a latent amine-based curing agent; particulate inorganic fillers as flow control agent; and at least one toughening agent selected from a group consisting of: (a) a pre-react adduct formed by the reaction of an epoxy resin, a bisphenol, and an elastomer; (b) a copolymer of polyether sulfone (PES) and polyether ether sulfone (PEES); (c) core-shell rubber (CSR) particles; and combinations thereof. Upon curing, the resulting thermoset surface film has a glass transition temperature ($T_g$) of ≥180° C., and a surface pencil hardness of greater than 7H as measured in accordance with ASTM D-3363.

The present disclosure also provides a composite structure having a surfacing film formed on a fiber-reinforced, resin-based composite substrate, and a method of making the composite structure. The surfacing film may be co-cured with the resin-based composite substrate at a temperature within the range of 250° F.-355° F. (or 120° C.-180° C.).

BRIEF DESCRIPTION OF THE DRAWINGS

The features of this disclosure will be more readily understood from the following detailed description of the various aspects of the disclosure taken in conjunction with the accompanying drawing that depict various embodiments of the disclosure.

FIG. 1 schematically shows a composite structure with a surfacing film being formed on a molding tool according to an embodiment of the present disclosure.

DETAILED DESCRIPTION

Typical epoxy-based surfacing films for use with aerospace composite parts are often affected when exposed to conventional alcohol-based paint strippers, such as benzyl alcohol-based solutions, and ultra-violet (UV) radiation. An improved surfacing film has been design to overcome these issues. The improved surfacing film composition has been formulated so as to yield high $T_g$ and high cross-linked density. It has been discovered that the combination of high $T_g$ and high cross-linked density renders the surfacing film highly resistant to alcohol-based paint stripper solutions, such as benzyl alcohol-based solutions. To achieve these properties, the surfacing film composition is based on a combination of certain multifunctional resins, a polymeric toughening component to toughen the resin matrix, a latent amined-based curing agent, ceramic microspheres as a fluid barrier component, and particulate inorganic fillers as a rheology modifying component. The multifunctional resins and the ceramic microspheres make up more than 50% by weight of the total composition, preferably more than 60% by weight. Detailed description of the components for surfacing film composition will now follow.

Multifunctional Resins

The surfacing film composition contains at least two multifunctional epoxy resins, one of which is an epoxy novolac resin having epoxy functionality of greater than one. The second epoxy resin is a non-novolac multifunctional epoxy resin, preferably, tetra- or tri-functional epoxy resin (i.e. epoxy resin having three or four or epoxy functional groups per molecule).

Suitable epoxy novolac resins include polyglycidyl derivatives of phenol-formaldehyde novolacs or cresol-formaldehyde novolacs having the following chemical structure (Structure I):

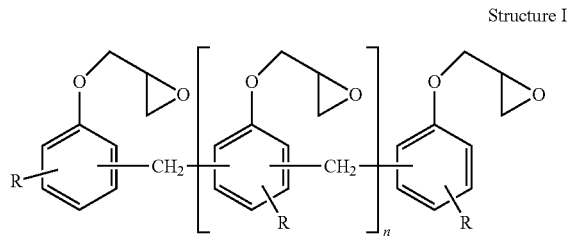

Structure I wherein n=0 to 5, and R=H or $CH_3$. When R=H, the resin is a phenol novolac resin. When R=$CH_3$), the resin is a cresol novolac resin. The former is commercially available as DEN 428, DEN 431, DEN 438, DEN 439, and DEN 485 from Dow Chemical Co. The latter is commercially available as ECN 1235, ECN 1273, and ECN 1299 from Ciba-Geigy Corp. Other suitable novolacs that may be used include SU-8 from Celanese Polymer Specialty Co. In a preferred embodiment, the epoxy novolac resin has a viscosity of 4000-10,000 mPa·s at 25° C. and epoxide equivalent weight (EEW) of 190-210 g/eq.

A suitable tetrafunctional epoxy resin is a tetrafunctional aromatic epoxy resin having four epoxy functional groups per molecule and at least one glycidyl amine group. As an example, the tetrafunctional aromatic epoxy resin may have the following general chemical structure (Structure II), namely tetraglycidyl ether of methylene dianiline:

Structure II

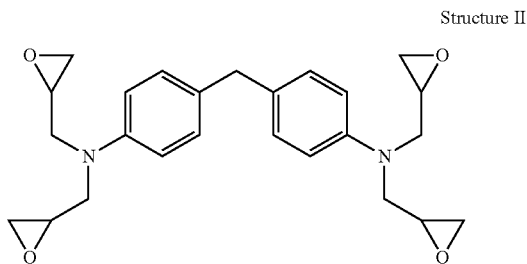 [SMILES: c1cc(N(CC2CO2)CC2CO2)ccc1Cc1ccc(N(CC2CO2)CC2CO2)cc1]

The amine groups in Structure II are shown in the para- or 4,4' positions of the aromatic ring structures, however, it should be understood that other isomers, such as 2,1', 2,3', 2,4', 3,3', 3,4', are possible alternatives. Suitable tetrafunctional aromatic epoxy resins include tetraglycidyl-4,4'-diaminodiphenylmethane commercially available as Araldite® MY 9663, MY 9634, MY 9655, MY-721, MY-720, MY-725 supplied by Huntsman Advanced Materials. Examples of tri-functional epoxy resins include triglycidyl ether of aminophenol, e.g. Araldite® MY 0510, MY 0500, MY 0600, MY 0610 supplied by Huntsman Advanced Materials.

In a preferred embodiment, the combination of epoxy novolac resin and multifunctional epoxy resin (tri-functional and/or tetra-functional) makes up at least 30% by weight based on the total weight of the surfacing film composition. In certain embodiments, the combination of epoxy novolac resin and multifunctional epoxy resin makes up about 30% to about 60% by weight based on the total weight of the surface film composition, and in other embodiments, about 40% to about 50% by weight. The relative amounts of epoxy novolac resin and multifunctional epoxy resin may be varied but it is preferred that the amount of epoxy novolac resin is with the range of 80-100 parts per 100 parts of multifunctional epoxy resin. The combination of epoxy novolac resin and multifunctional epoxy resin at the specified proportion contribute to the desired high $T_g$ and tailored cross-linked density upon curing.

Polymeric Toughening Component

To toughen the resin matrix based on the mixture of multifunctional resins discussed above, one or more polymeric toughening agents are added to the surfacing film composition. The polymeric toughening agents are selected the group consisting of: (i) a pre-react adduct formed by the reaction of an epoxy resin, a bisphenol, and an elastomeric polymer; (ii) a copolymer of polyether sulfone (PES) and polyether ether sulfone (PEES); and (iii) core-shell rubber particles; and combinations thereof. In a preferred embodiment, a combination of two toughening agents from this group is used. The amount of toughening agent(s), in total, is about 10% to about 20% by weight based on the total weight of the surfacing film composition.

With regard to the pre-react adduct, suitable epoxy resins include Diglycidylether of Bisphenol A, Diglycidylether of Tetrabromo Bisphenol A hydrogenated diglycidyl ether of bisphenol A or hydrogenated diglycidyl ether of bisphenol F. Also suitable are cycloaliphatic epoxies, which include compounds that contain at least one cycloaliphatic group and at least two oxirane rings per molecule. Specific examples include diepoxide of cycloaliphatic alcohol, hydrogenated Bisphenol A (Epalloy™ 5000, 5001 supplied by CVC Thermoset Specialties) represented by the following structure:

Structure III

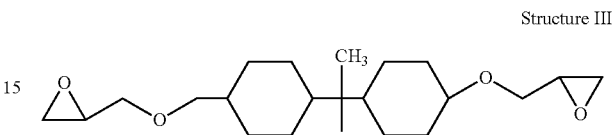

An example of such cycloaliphatic epoxy resin is EPALLOY® 5000 (a cycloaliphatic epoxy prepared by hydrogenating bisphenol A diglycidyl ether) available from CVC Thermoset Specialties. Other cycloaliphatic epoxides suitable for use in the pre-react adduct may include EPONEX cycloaliphatic epoxy resins, e.g. EPONEX Resin 1510 supplied by Momentive Specialty Chemicals;

The bisphenol in the pre-react adduct functions as a chain extension agent for the linear or cycloaliphatic epoxy. Suitable bisphenols include bisphenol A, tetrabromo bisphenol A (TBBA), Bisphenol Z, and Tetramethyl Bisphenol A (TMBP-A).

Suitable elastomers for forming the pre-react adduct include, but are not limited to, rubbers such as, for example, amine-terminated butadiene acrylonitrile (ATBN), carboxyl-terminated butadiene acrylonitrile (CTBN), carboxyl-terminated butadiene (CTB), fluorocarbon elastomers, silicone elastomers, styrene-butadiene polymers. In an embodiment, elastomers used in the pre-react adduct is ATNB or CTBN.

In one embodiment, the epoxy resin is pre-reacted with the bisphenol chain extension agent, and the elastomer polymer in the presence of a catalyst such as triphenyl phosphine (TPP) at about 300° F. (or 148.9° C.) to chain link the epoxy resins and to form a high viscosity, film-forming, high molecular weight epoxy resin pre-react adduct. The pre-react adduct is then mixed with the remaining components of the surface film composition.

A second option for the polymeric toughening component is a thermoplastic toughening material which is a copolymer of polyether sulfone (PES) and polyether ether sulfone (PEES) with an average molecular weight of 8,000-14,000. In an embodiment, the toughener is poly(oxy-1,4-phenylenesulfonyl-1,4-phenylene), which has a $T_g$ of about 200° C.

The third option for the polymeric toughening component is core-shell rubber particles having particle size of 300 nm or less. The core-shell rubber (CSR) particles may be any of the core-shell particles where a soft core is surrounded by a hard shell. Preferred CSR particles are those having a polybutadiene rubber core or butadiene-acrylonitrile rubber core and a polyacrylate shell. CSR particles having a hard core surrounded by a soft shell may also be used, however. The CSR particles may be supplied as a 25-40 weight percent of CSR particles dispersed in a liquid epoxy resin. CSR particles having rubber cores and polyacrylate shells are available commercially from Kaneka Texas Corporation (Houston, Tex.) under the tradenames Kane Ace MX. It is preferred, but not required, that the core-shell rubber particles be added to the surfacing film composition as a suspension of particles in a suitable liquid epoxy resin. Kane Ace MX 411 is a suspension of 25% by weight core-shell rubber particles in MY 721 epoxy resin and is a suitable source of core-shell rubber particles. Kane Ace MX 120, MX 125, or MX 156, which contains 25-37% by weight of the same core-shell rubber particles dispersed in DER 331 resin, is also a suitable source of core-shell rubber particles. Other suitable source of core-shell rubber particles, such as MX 257, MX 215 and MX 451, may also be used. Another commercial source of core-shell rubber particles is Paraloid™ EXL-2691 from Dow Chemical Co. (methacrylate-butadiene-styrene CSR particles with average particle size of about 200 nm).

Ceramic Microspheres

Ceramic microspheres are added to the surfacing film composition to improve the surface smoothness of the film. In one embodiment, hollow, ceramic microspheres made of an inert silica-alumina ceramic material are used. The ceramic microspheres may have a crush strength of over 60,000 psi, a dielectric constant of about 3.7-4.6, a softening point in the range of 1000-1100° C. (or 1832-2012° F.), and particle diameters ranging from 0.1 micron to 50 microns, or 1-50 microns. The high softening point of the ceramic microspheres enables them to be nonabsorbent to solvents, non-flammable, and highly resistant to chemicals. Microspheres having diameters ranging from about 0.1 to about 20 microns, and preferably from about 1 to about 15 microns have been found to be particularly suitable. An example of commercially available ceramic microspheres which are particularly suitable for use in the present surface film composition are sold by Zeelan Industries, Inc. under the trade name Zeeospheres®, for example, G-200, G210 and W-200. These are hollow, silica-alumina spheres with thick walls, odorless, and light gray in color. In a preferred embodiment, the combination of the multifunctional resins and ceramic microspheres makes up more than 50% by weight, preferably more than 60% by weight, of the surface film composition. In certain embodiments, the amount of ceramic microspheres is at least 20% by weight, preferably at least 25% or at least 30% by weight, based on the total weight of the surface film composition. In some embodiments, the amount of ceramic microspheres may be within the range of 20%-40% by weight, or 25%-35% by weight.

Curing Agent

The multifunctional epoxide resins may be cured by a variety of latent amine-based curing agents, which are activated at elevated temperatures (e.g. temperature above 150° F. (65° C.). Examples of suitable curing agents include dicyandiamide (DICY), guanamine, guanidine, aminoguanidine, and derivatives thereof. Compounds in the class of imidazole and amine complexes may also be used. In an embodiment, the curing agent is dicyandiamide. The amine-based curing agent is present in an amount within the range of 1-5% by weight based on the total weight of the surfacing film composition.

A curing accelerator may be used in conjunction with the amine-based curing agent to promote the curing reaction between the epoxy resins and the amine-based curing agent. Suitable curing accelerators may include alkyl and aryl substituted ureas (including aromatic or alicyclic dimethyl urea); bisureas based on toluenediamine or methylene dianiline. One example of bisurea is 4,4'-methylene bis(phenyl dimethyl urea) (commercially available as Omicure U-52 or CA 152 from CVC Chemicals), which is a suitable accelerator for dicyandiamide. Another example is 2,4-toluene bis(dimethyl urea) (commercially available as Omicure U-24 or CA 150 from CVC Chemicals). The curing accelerator may be present in an amount within the range of 0.5%-3% by weight.

Flow Control Agents

Inorganic fillers in particulate form (e.g. powder) are added to the surfacing film composition as a rheology modifying component to control the flow of the resinous composition and to prevent agglomeration therein. Suitable inorganic fillers that may be used in the surface film composition include talc, mica, calcium carbonate, alumina, and fumed silica. In one embodiment, hydrophobic fumed silica (e.g. Cab-O-Sil TS-720) is used as the inorganic filler. The amount of inorganic filler may be within the range of 1-5% by weight based on the total weight of the surfacing film composition.

Optional Additives

The surfacing film composition may further include one or more optional additives which affect one or more of mechanical, electrical, optical, flame resistance, and/or thermal properties of the cured or uncured surfacing film. The additives may comprise materials that chemically react with the epoxy resins of the composite substrate on which the surfacing film is formed or may be unreactive to them. Such additives include, but are not limited to, ultraviolet (UV) stabilizers, pigments/dyes, and conductive materials. When such additives are used, their total amount is less than 5% by weight based on the total weight of the surfacing film composition.

Examples of UV stabilizers that may be added to the surface composition include butylated hydroxytoluene (BHT), 2-hydroxy-4-methoxy-benzophenone (UV-9), 2,4-bis(2,4-dimethylphenyl)-6-(2-hydroxy-4-octyloxyphenyl)-1,3,5-triazine (CYASORB® UV-1164 light absorber), 3,5-di-tert-butyl-4-hydroxybenzoic acid, n-hexadecyl ester (CYASORB® UV-2908 light stabilizer), Pentaerythritol Tetrakis(3-(3,5-di-tert-butyl-4-hydroxyphenyl)propionate (IRGANOX 1010). Liquid hindered amine light stabilizer from Ciba Specialty Chemicals, such as 2-(2H-benzotriazol-2-yl)-4,6-ditertpentylphenol (TINUVIN 328), Methyl 1,2,2,6, 6-pentamethyl-4-piperidyl sebacate (TINUVIN 292). Decanedioic acid, bis(2,2,6,6-tetramethyl-1-(octyloxy)-4-piperidinyl ester (TINUVIN 123), may also be used as suitable UV stabilizers. In addition, nanosized zinc oxide (n-ZnO), e.g. NanoSunGuard 3015, and titanium oxide nanoparticles (n-TiO2) may also be used as UV stabilizers.

Pigments and/or dyes known in the art for adding color to the resinous systems may be added to the surfacing film composition. Examples of pigments and/or dyes include, but are not limited to, red iron oxide, green chromium, carbon black, and titanium oxide. In an embodiment, the pigment is a titanium oxide (white) pigment. In another embodiment, the pigment is carbon black.

Conductive materials in particulate form, e.g. particles or flakes, may also be added to the surfacing film composition to impart electrical conductivity to the finished surface film. Examples of suitable conductive materials include metals in the form of flakes or particles such as silver, gold, nickel, copper, aluminum, and alloys thereof. Carbon-based nano-sized materials, such as carbon nano-tubes (single-wall nano tubes or multi-wall nano tubes), carbon nano-fibers, graphene, bucky-paper, can also be used as conductive constituents to impart the electrical conductivity to the resin film. The nano-fibers may have diameters ranging from 70 and 200 nanometers and a length of about 50-200 microns. The nano-tubes may have an outer diameter of about 10 nanometers, length of about 10,000 nanometers, and an aspect ratio (L/D) of about 1000.

Table 1 shows various embodiments of the surfacing film composition according to the present disclosure. All percentages (%) are weight percentages.

TABLE 1

| Components | Embodiments | | | | | | | |
|---|---|---|---|---|---|---|---|---|
| | 1 | 2 | 3 | 4 | 5 | 6 | 7 | 8 |
| Multifunctional Epoxy Resins | | | | | | | | |
| Epoxy phenol novolac resin (e.g., DEN 439, DEN 438L, DEN 431) | 5-15% | 5-15% | 20-40% | 40-55% | 20-40% | 20-40% | 20-30% | 20-40% |
| Tetraglycidylether methylenedianiline (e.g., MY 9663, MY 9655, 9634, 721, 725) | 5-15% | 5-15% | 20-40% | | 20-40% | | | |
| Triglycidyl ether of aminophenol (MY 0510, 600, 610) | | | | 3-10% | | | | |
| Toughening Agent | | | | | | | | |
| Pre-react adduct of Bisphenol A, epoxy, and elastomer | 5-15% | 5-15% | | | 10-20% | | 5-15% | |
| Acrylonitrile butadiene polymer (NIPOL 1472) | | 0.5-2% | 0.5-2% | 0.5-2% | 0.5-2% | | 0.5-2% | |
| Hycar CTBN or CTB elastomer | | 0.5-2% | 0.5-2% | 0.5-2% | 0.5-2% | | 0.5-2% | |
| Bisphenol A diglycidyl ether with CSR particles (25 wt %) (MX 120, MX 125, MX 156, MX 257) | | | | | | 20-40% | 10-25% | 10-25% |
| CSR particles (e.g. Paraloid 2691) | | | 3-6% | 3-6% | | | | |
| PES-PEES co-polymer | 0.5-5% | 0.5-5% | 0.5-5% | | | | | |
| Curing agents | | | | | | | | |
| Dicyandiamide (DICY) | 0.5-5% | 0.5-5% | | 0.5-5% | 0.5-5% | | 0.5-5% | 0.5-5% |
| Bisureas (e.g. CA 150, CA 152) | 0.5-3% | 0.5-3% | | 0.5-3% | 0.5-3% | | 0.5-3% | 0.5-3% |
| $BF_3$ | | | | | | 0.5-1% | | |
| 4,4'-DDS | | | 5-30% | | | 5-30% | | |
| Ceramic microspheres (e.g. Zeeospheres G-200, G-210 or W-200) | 5-15% | 20-40% | 20-40% | 20-40% | 10-30% | 20-40% | 20-40% | 20-40% |
| Flow control agent | | | | | | | | |
| Fumed silica (e.g. Cabosil TS-720) | 0.5-3% | 0.5-5% | 0.5-5% | 0.5-5% | 0.5-5% | 0.5-5% | 0.5-5% | 0.5-5% |
| UV stabilizers/additives | | | | | | | | |
| Butylated Hydroxytoluene (BHT) | | 0.5-3% | | | | | | 0.5-3% |
| 2-hydroxy-4-methoxy-benzophenone (e.g. UV-9) | | 0.5-3% | | | | | | 0.5-3% |
| Nanosized ZnO (e.g. NanoSunGuard 3015) | | | | 2-6% | | | | |
| Phenolic antioxidants (e.g. Irganox 1010, or UV 2908) | 0.5-3% | | 0.5-3% | 0.5-3% | | 0.5-3% | 0.5-3% | |
| Triazine or triazole UV absorbers (e.g. Tinuvin 328 UVA, UV 1164 UVA) | 0.5-3% | | 0.5-3% | 0.5-3% | | 0.5-3% | 0.5-3% | |
| Liquid hindered amines (e.g Tinuvin 292 HALS) | 0.5-3% | | 0.5-3% | | | 0.5-3% | | |
| Conductive Additives | | | | | | | | |
| Silver flakes, copper flakes, Ag—Cu flakes | 40-70% | | 40-70% | | | | | |
| Carbon black particles | | | | | | | 2-5% | 2-5% |
| Carbon-based Nanoparticles (Carbon nano-tubes, Carbon nano-fibers, Graphene, etc.) | | | | | | 1-3% | 1-3% | |
| Pigments | | | | | | | | |
| $TiO_2$ | 0.5-5% | 0.5-5% | 0.5-5% | 0.5-5% | 0.5-5% | | 0.5-5% | |

In one embodiment, the surfacing film composition has the following formulation, in weight percentages based on the total weight of the composition: 20%-25% epoxy phenol novolac resin; 20%-25% tetra-functional epoxy resin; 10%-15% pre-react adduct, 1%-3% PES-PEES copolymer, 25%-35% ceramic microspheres; 1%-5% latent amine-based curing agent; 0.5%-3% curing accelerator; 1%-3% inorganic fillers; and optionally 0.1-1% color pigment.

Formation of Surfacing Film and Composite Structure

The components of the surfacing film composition may be added to a mixing vessel equipped for mixing, heating, and/or cooling the components. Furthermore, one or more organic solvents may also be added to the mixture, as necessary, to facilitate the mixing of the components. Examples of such solvents may include, but are not limited to, methyl ethyl ketone (MEK), acetone, dimethylacetamide, and N-methylpyrrolidone. A surfacing film is subsequently formed from the surface film composition using conventional film-forming processes. The surface film so formed may have a film weight ranging between about 0.01 to 0.45 psf (pounds per square foot), depending on the intended use.

To facilitate the handling of the surfacing film, the surfacing film composition is applied onto a carrier. Non-limiting examples of the carrier may include fibrous sheets made of thermoplastic polymer fibers or carbon fibers, metallic screens or foils, non-woven mats, random mats, knit carriers, metal coated carbon veils, and the like. Examples of metallic screens or foils may include expanded metallic screens or foils, and metal coated veils. Such screens and foils may comprise copper, aluminum, silver, nickel, and alloys thereof. Examples of non-woven mats, woven or knit backings may include carbon mats, polymer mats, and metal coated carbon, glass, or polymer glass veils. The non-woven mat, woven or knit backing may be coated with copper, aluminum, silver, nickel, and alloys thereof.

The surfacing film so formed may also be stored, in an uncured state, until it is ready for use. For example, the surfacing film may be stored in a cold storage in order to inhibit curing of the surfacing film and to prolong its useful shelf life. Removable backing paper may be applied to one or more surfaces of the surfacing film in order to inhibit the surfacing film from attaching to unwanted surfaces prior to its intended use.

The surfacing film is designed to be co-cured with a fiber-reinforced, resin matrix composite substrate at a temperature above 150° F. (65° C.), more particularly, within the range of 250° F.-350° F. (or 120° C.-175° C.). The fiber-reinforced, resin matrix composite substrate is composed of reinforcement fibers which have been impregnated or infused with a matrix resin. The matrix resin may include one or more thermosettable resins such as epoxy resins. The composite substrate may be a prepreg ply or a prepreg layup. The prepreg ply is composed of reinforcement fibers in the form of a fabric or directionally aligned, continuous fibers that have been impregnated with a resin, e.g. epoxy resin. The directionally aligned fibers may be unidirectional or multi-directional fibers. The prepreg layup is composed of a plurality of prepreg plies arranged in a stacking sequence. In general, the uncured surfacing film may be applied onto a fiber-reinforced, resin matrix composite substrate, which is in an uncured or partially cured state, followed by co-curing to form a fully-cured composite substrate having a thermoset surfacing film bonded thereto.

In one embodiment, the surfacing film is incorporated in a laying-up process to form a composite structure. As shown in FIG. 1, the surfacing film 10 is first placed into contact with a molding surface of a molding tool 20, and prepreg plies are sequentially laid up, one on top of another, on the surfacing film 10 to form a prepreg layup 30. Alternatively, the prepreg plies may be assembled at a different location and then subsequently placed onto the surfacing film 10. One or more cores, e.g. foam or honeycomb structures, may be interposed between plies of the prepreg layup, as known in the art. The entire assembly is then subjected to heat and pressure to cure the prepreg layup and the surfacing film into a final composite structure with a selected shape. When the composite structure is removed from the molding tool, the surfacing film becomes the outmost layer of the composite structure.

In one embodiment, the surfacing film may be applied (by coating or lamination) to a single prepreg ply to produce a self-surfacing prepreg tape. Such self-surfacing prepreg tape is suitable for use in an Automated Tape Laying (ATL) or Automated Fiber Placement (AFP) system equipped with means for dispensing and compacting prepreg slit tapes directly onto a molding surface (such as a mandrel surface) to form a composite part.

Upon curing, the resulting cured surfacing film is a thermoset film with high cross-linked density, a high glass transition temperature ($T_g$) of ≥180° C., a pencil hardness of 7H or higher according to ASTM D-3363. These properties enable the cured surfacing film to exhibit high resistance to conventional paint strippers (e.g. benzol alcohol-based paint stripping solutions), as well as UV radiation and micro-cracking. It has been found that, after being in contact with a benzyl alcohol-based paint stripping solution for 7 days at ambient temperature (20° C.-25° C.), the surfacing film exhibits less than 0.5% fluid absorption, and the pencil hardness is not reduced by more than 2H pencil grades. Furthermore, the cured surfacing film has been found to exhibit a micro-crack density of less than 0.3 cracks/in$^2$ after being subjected to a 2000× thermal cycling testing between −55° C. and 71° C. The surfacing film further exhibits high adherence to paint coatings normally used for painting aerospace structures. The adherence of the surfacing film to the paint coating is such that the painted surface exhibits substantially 0% paint loss after being subjected to a paint adhesion test in accordance with ASTM D3359 under a dry condition or wet condition (after immersion in de-ionized water at 75° F. for 7 days), with or without being subjected to 1000 KJ/m$^2$ UVA radiation exposure.

EXAMPLES

The following examples serve to give specific embodiments of the surface films formed according to the present disclosure but are not meant in any way to limit the scope of the present disclosure.

Nine surfacing film samples were prepared based on the formulations (1-9) shown in Table 2. All amounts are in weight percentage.

TABLE 2

| | Formulations | | | | | | | | |
|---|---|---|---|---|---|---|---|---|---|
| Components | 1 | 2 | 3 | 4 | 5 | 6 | 7 | 8 | 9 |
| Epoxy phenol novolac resin | 27.3 | 21.5 | 23.4 | 8.9 | 9.6 | 47.3 | 46 | 25.7 | 22.7 |
| Tetraglycidyl 4,4'-diaminodiphenylmethane | 30.2 | 23.7 | 25.9 | 12.4 | 13.4 | | | | |
| Triglycidyl ether of aminophenol | | | | | | | | 4.5 | 4.3 |

TABLE 2-continued

| Components | Formulations | | | | | | | | |
|---|---|---|---|---|---|---|---|---|---|
| | 1 | 2 | 3 | 4 | 5 | 6 | 7 | 8 | 9 |
| Pre-react adduct of Bisphenol A, epoxy, and elastomer | 18 | 14.1 | 6.2 | 13.3 | 12.8 | | | | 9.1 |
| Bisphenol A diglycidyl ether with CSR particles (25 wt %) | | | | | | | | 31.4 | 18.2 |
| PES-PEES co-polymer | | 1.41 | 1.9 | 0.9 | 0.96 | | | | |
| Dicyandiamide | 4.3 | 3.4 | 3.7 | 1.8 | 1.92 | 3.6 | 3.5 | 2.9 | 2.3 |
| 4,4'-Methylene bis(phenyldimethylurea) | 2.2 | 1.7 | 1.9 | 0.9 | 0.96 | 1.8 | 1.7 | 2.9 | 2.3 |
| Ceramic microspheres | 14.4 | 31.1 | 33.9 | 5.9 | 6.4 | 35.7 | 35 | 28.6 | 34 |
| Butylated Hydroxytoluene (BHT) | | | | | | | | 1.1 | 1.2 |
| 2-hydroxy-4-methoxy-benzophenone | | | | | | | 1.7 | 1.1 | 1.2 |
| Blue ZV based dye | | | | | | | 0.1 | | |
| Pentaerythritol tetrakis(3-(3,5-di-tert-butyl-4 hydroxyphenyl) propionate | | | | | | | 1.7 | | |
| hydroxyphenylbenzotriazole | | | | | | | 1.7 | | |
| Fumed silica | 3.2 | 2.5 | 2.8 | 1.3 | 1.4 | 4 | 3.9 | 2.9 | 3.2 |
| Silver flakes | | | | 53.3 | | | | | |
| Ag—Cu flakes | | | | | 51.2 | | | | |
| Carbon black | | | | | | | | 3.4 | 3.6 |
| TiO$_2$ pigment | 0.72 | 0.56 | 0.62 | 1.1 | 1.3 | 3.1 | 0.9 | | 2.3 |
| Total | 100 | 100 | 100 | 100 | 100 | 100 | 100 | 100 | 100 |

Each surfacing film was prepared by adding the components disclosed in Table 2 into a mixing vessel and mixing the components using a high-speed shear lab mixer. The epoxy resins were added first. MEK was added as a solvent to the epoxy resin mixture, as necessary, in order to adjust the rheology and solid content of the composition. Subsequently, the toughening agent(s) (pre-react adduct and/or PES-PEES co-polymer) was added to the epoxy resins. In certain surfacing films (Formulations 4 and 5), conductive additives (silver flakes or Ag—Cu flakes) were also added to the mixing vessel. Ceramic microspheres, fumed silica, and UV stabilizers (in some formulations) were further added to the mixing vessel. MEK solvent was added, as necessary, to control the viscosity of above mix to about 80 wt. % solids and the components of the composition were mixed for about 50-70 minutes at about 1000-3000 rpm. The temperature of the composition was kept below about 160° F. Additional MEK was added, as necessary, to inhibit the mixture from climbing the mixing shaft.

The mixture was subsequently cooled to below about 120° F. and the curing agents (dicyandiamide (Dicy) and Bisurea) were added to the composition. The composition was then mixed until approximately homogenous. The temperature of the mixture, during addition of the curing agents, was maintained below about 130° F.

To form surfacing films from the above compositions, each composition was strained, de-aired, and deposited as a film. Straining was performed through filtration media EP-15. De-airing was performed such that the solid content of the composition was about 80 wt. %. The strained and de-aired composition was then coated as a film having a film weight of about 0.020-0.030 psf by a film coater, and then dried so as to achieve less than about 1% by weight volatiles. A selected non-woven polyester or glass random mat carrier or conductive carrier was pressed into the film under light pressure to embed the mat to the film.

Composite panels were fabricated by incorporating the surfacing films formed from the formulations of Table 2. For each panel, the surfacing film was placed on a tool, followed by laying up of prepreg plies (CYCOM 5276-1 from Cytec Industries Inc., carbon fibers/epoxy based prepregs) to form a prepreg layup. The prepreg layup was then cured at a temperature between about 350° F. for 2 hours under 80 psi in an autoclave conditions.

Surfacing Film Evaluation

The glass transition temperature (Tg) of the cured surfacing films were determined by using either a modulated DSC (TA 2910) or a thermal mechanical analyzer (TMA 2940, TA Instruments) under nitrogen at ramp of 10° C./min within 30° C.-230° C. temperature range.

After curing, the composite panels surfaced with the surfacing films were inspected for surface appearance defects (pits, pin holes). Then the composite panels were evaluated for its paint stripper resistance, dry and wet paint adhesion with or without UV exposure, and micro-crack resistance.

Paint Stripper Resistance Testing

Paint stripper resistance of unpainted, surfaced composite panels (2"×2" specimen size, with 0.15 mm thickness) were measured by measuring the paint stripper fluid uptake and surface pencil hardness change over the immersion period (up to 168 hours at ambient room temperature) of benzyl alcohol-based paint stripper solution (Cee Bee 2012A available from McGean or Turco 1270-6 available from Henkel) used for aerospace composite structure paint-stripping process. The weight of each test panel was measured before and after paint stripper soak at interval of 24 hours, 48 hours and up to 168 hours (7 days). The paint stripper fluid uptake (weight change over immersion time, expressed in wt. %) of the tested panel was measured at same test intervals up to 168 hours (7 days) immersion.

The surface of each unpainted test panel was immersed the benzyl alcohol-based paint stripper solution for up to 168 hours at ambient room temperature, and then tested for pencil hardness change during the immersion period according to ASTM D3363. ASTM D3363 refers to a Standard Test Method for determining the surface hardness of clear and pigmented organic coating film on a substrate. The pencil hardness scale is as follows: 6B (softest), 5B, 4B, 3B, 2B, B, HB, F, H, 2H, 3H, 4H, 5H, 6H, 7H, 8H, 9H (hardest). The pencil hardness of the test panel was measured before and after soaking in the paint stripper at interval of 24 hours, 48 hours and up to 168 hours (7 days). Pencil hardness that changes more than 2H level upon 24 hour immersion is not considered as having good paint stripper resistance.

Dry and Wet Paint Adhesion with or without UV Exposure

Dry and wet scribe paint adhesion of painted composite panels (in the form of 3"×6" specimen size, with 0.15 mm thickness) surfaced with the surfacing film, with or without UV exposure prior to painting, were measured according to ASTM D3359. ASTM D3359 refers to a Standard Test Method for assessing the surface adhesion of coating films to substrates by applying and removing pressure-sensitive tape over cuts made in the film (cross-hatch scribe tape test). The cured test panels were exposed to zero (without UV), 200 kJ/m$^2$ or 1000 kJ/m$^2$ ultraviolet (UV-A) radiation in accordance with AATCC Test Method 16, Option 3. Instrument used for UV testing is a Xeno Weather-o-meter, such as Atlas CI3000 FadeoMeter. Each test panel surface was prepared (cleaned, with and without sanding) and applied with an exterior decorative paint coating used in aerospace painting (epoxy paint primer followed by a polyurethane based top-coat). Subsequently, dry paint adhesion test was conducted in accordance with ASTM D3359. For conducting wet paint adhesion, the UV exposed test panels were painted and then immersed in de-ionized water at 75° F. for 7 days. Wet paint adhesion test was then conducted in accordance with ASTM D3359.

Electrical Conductivity Measurements of Surfacing Films Containing Conductive Additives The test panels with cured surfacing films were cut to form test coupons of about 6×5 inches and their electrical conductivity or surface resistivity (in Ohm/square, or milliohm/square) was measured using a four-point probe AVO® Ducter® DLRO10X Digital Low Resistivity Ohmmeter.

Table 3 shows the surface properties and test results for the test panels with surfacing films based on the formulations 1-9 of Table 2. The test panel number corresponds to the surfacing film formulation number.

TABLE 3

| | | Test Panels | | | | | | | | |
|---|---|---|---|---|---|---|---|---|---|---|
| | | 1 | 2 | 3 | 4 | 5 | 6 | 7 | 8 | 9 |
| $T_g$ (° C.) | | 190 | 189 | 190 | 185 | 181 | 182 | 180 | 151 | 148 |
| Paint stripper resistance | Day 0 | 0 | 0 | 0 | 0 | 0 | 0 | 0 | 0 | 0 |
| | Day 1 | 0.18 | 0.21 | 0.21 | 0.19 | 0.20 | 0.21 | 0.19 | 0.18 | 0.38 |
| | Day 2 | 0.24 | 0.27 | 0.26 | 0.22 | 0.23 | 0.24 | 0.23 | 0.41 | 0.80 |
| | Day 3 | 0.30 | 0.31 | 0.32 | 0.27 | 0.28 | 0.28 | 0.33 | 0.59 | 1.04 |
| | Day 4 | 0.34 | 0.35 | 0.36 | 0.39 | 0.40 | 0.32 | 0.35 | 1.12 | 1.45 |
| | Day 5 | 0.36 | 0.38 | 0.39 | 0.41 | 0.43 | 0.36 | 0.40 | 1.32 | 1.63 |
| | Day 7 | 0.40 | 0.44 | 0.45 | 0.47 | 0.49 | 0.40 | 0.45 | 1.65 | 1.82 |
| Surface pencil hardness | Day 0 | 9H | 9H | 9H | 9H | 9H | 9H | 9H | 9H | 9H |
| | Day 1 | 9H | 9H | 9H | 9H | 9H | 9H | 9H | 8H | 8H |
| | Day 2 | 9H | 9H | 9H | 9H | 9H | 9H | 9H | 4H | 4H |
| | Day 3 | 9H | 9H | 9H | 9H | 9H | 9H | 9H | 3H | HB |
| | Day 4 | 9H | 9H | 9H | 9H | 9H | 9H | 9H | 3H | HB |
| | Day 5 | 9H | 9H | 9H | 9H | 9H | 9H | 9H | 3H | HB |
| | Day 7 | 9H | 9H | 9H | 7H | 7H | 9H | 9H | HB | HB |
| Paint adhesion | | | | | | | | | | |
| Dry scribe w/UV | 7 days | 10+ | 10+ | 10+ | 10+ | 10+ | 10+ | 10+ | 10+ | 10+ |
| Wet scribe w/UV | 7 days | 10+ | 10+ | 10+ | 10+ | 10+ | 10+ | 10+ | 10+ | 10+ |
| Dry scribe w/o UV | 7 days | 10+ | 10+ | 10+ | 10+ | 10+ | 10+ | 10+ | 10+ | 10+ |
| Wet scribe w/o UV | 7 days | 10+ | 10+ | 10+ | 10+ | 10+ | 10+ | 10+ | 10+ | 10+ |
| Wet scribe w/o UV | | 10+ | 10+ | 10+ | 10+ | 10+ | 10+ | 10+ | 10+ | 10+ |
| Surface Resistivity (mΩ/sq) | | | | | 17(<20) | 89(<90) | | | | |

The surfacing films based on formulations 8 and 9 did not contain tri-functional or tetra-functional epoxy resin, as a result, their resistance to the paint stripper over the immersion period was not as good as that observed for other surfacing films. However, all surfacing films exhibited good paint adhesion (10+means 0% paint loss).

Micro-Crack Resistance Testing

The resistance to micro-cracking of painted and surfaced composite test panels (in the form of 4"×6" specimen size, with 0.15 mm thickness) was also measured. The painted test panels were subjected to thermal cycling between −55° C. and 71° C. up to 2000× cycles. The surface of each test panel after thermal cycling was examined under microscope for micro-crack occurrence after being exposed to 400×, 800×, 1200×, 1600× and 2000× thermal cycles. The crack-density (number of surface paint cracks shown in the test panel size area) is used to measure the micro-crack resistance of the surfaced composite test panel. The maximum length of crack should be less than 0.1 inch. The micro-crack test results after 2000× thermal cycles are shown in Table 4.

TABLE 4

| | Thermal Cycling Test Results | | | | | | | | |
|---|---|---|---|---|---|---|---|---|---|
| | Test Panels | | | | | | | | |
| | 1 | 2 | 3 | 4 | 5 | 6 | 7 | 8 | 9 |
| Crack density (cracks/in$^2$) | 0.20 | 0 | 0.26 | 0 | 0 | 0.65 | 0.61 | 0.43 | 0.38 |

Surfacing films based on formulations 6 and 7 did not contain the toughening agents that were in other formulations. As a result, the micro-crack resistance of test panels 6 and 7 was not as good as that of other test panels.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" and 'about' used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges, for example, "1 wt % to 10 wt %" includes 1%, 2%, 3%, etc.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for making a composite structure comprising:
   (a) providing a shapeable prepreg layup comprised of a plurality of prepreg layers arranged in a stacking arrangement, each prepreg layer comprising an uncured or partially cured resin matrix resin and reinforcing fibers;
   (b) forming a surfacing film from a curable resin composition comprising:
   an epoxy novolac resin having epoxy functionality of more than one;
   a tri-functional or tetrafunctional epoxy resin;
   ceramic microspheres;
   a latent amine-based curing agent;
   particulate inorganic fillers; and
   a pre-react adduct formed by the reaction of diglycidylether of tetrabromo Bisphenol A, bisphenol A, and an elastomer selected from: amine-terminated butadiene acrylonitrile (ATBN); carboxyl-terminated butadiene acrylonitrile (CTBN); and carboxyl-terminated butadiene (CTB);
   (c) placing the surfacing film into contact with the prepreg layup; and
   (d) co-curing the surfacing film and the prepreg layup at a temperature within the range of 250° F.-350° F.

2. The method of claim 1, wherein the epoxy novolac resin has the following structure:

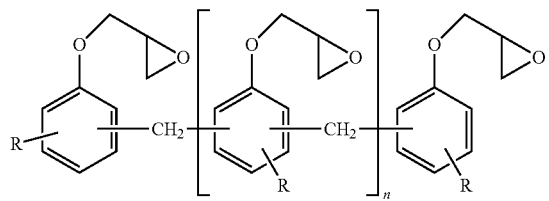

where R═H and n=0-5, the tetra-functional epoxy resin is tetraglycidyl 4,4'-diaminodiphenylmethane, and the tri-functional epoxy is triglycidyl ether of aminophenol.

3. The method claim 1, wherein the curable resin composition further comprises a copolymer of polyether sulfone (PES) and polyetherether sulfone (PEES).

4. The method of claim 1, wherein the ceramic microspheres in the curable resin composition are hollow microspheres made of silica-alumina ceramic material.

5. The method of claim 1, wherein the curable resin composition further comprises a bisurea as a curing accelerator.

6. The method claim 1, wherein the curable resin composition further comprises a conductive material in particulate form in sufficient amount to provide a conductive surfacing film with a surface resistivity of less than 100 mΩ.

7. The method of claim 1, wherein, after co-curing, the surfacing film exhibits a pencil hardness of 7H to 9H according to ASTM D-3363.

8. The method of claim 1, further comprising applying a paint coating on the surfacing film after co-curing, wherein the adherence of the surfacing film to the paint coating is such that the painted surface exhibits substantially 0% paint loss after (a) being subjected to a paint adhesion test in accordance with ASTM D3359 under a dry condition or (b) immersing in de-ionized water at 75° F. for 7 days then being subjected to a paint adhesion test in accordance with ASTM D3359.

9. The method of claim 1, further comprising applying a paint coating on the surfacing film after co-curing, wherein the adherence of the surfacing film to the paint coating is such that the painted surface exhibits substantially 0% paint loss as determined by the following procedure: subjecting the unpainted surfacing film to 1000 KJ/m$^2$ UVA radiation exposure, followed by subjecting the painted surface to a paint adhesion test in accordance with ASTM D3359 under a dry condition.

* * * * *